United States Patent
Archibald et al.

(10) Patent No.: US 7,558,892 B2
(45) Date of Patent: Jul. 7, 2009

(54) PROCESSING DEVICE PERIPHERAL WITH INTEGRAL NETWORK INTERFACE CIRCUITRY

(75) Inventors: James L. Archibald, Schnecksville, PA (US); David P. Sonnier, Austin, TX (US)

(73) Assignee: Agere Systems Inc., Allentown, PA (US)

( * ) Notice: Subject to any disclaimer, the term of this patent is extended or adjusted under 35 U.S.C. 154(b) by 1259 days.

(21) Appl. No.: 10/215,076

(22) Filed: Aug. 8, 2002

(65) Prior Publication Data

US 2004/0030817 A1 Feb. 12, 2004

(51) Int. Cl.
*G06F 13/12* (2006.01)

(52) U.S. Cl. .............................. 710/62; 710/14; 710/37; 710/38; 710/65; 710/66

(58) Field of Classification Search .................. 710/14, 710/37, 38, 62–66; 455/556.1–559
See application file for complete search history.

(56) References Cited

U.S. PATENT DOCUMENTS

| | | | | |
|---|---|---|---|---|
| 5,739,665 | A * | 4/1998 | Bares | 320/115 |
| 5,793,359 | A | 8/1998 | Ushikubo | |
| 5,812,531 | A * | 9/1998 | Cheung et al. | 370/255 |
| 5,878,211 | A * | 3/1999 | Delagrange et al. | 726/34 |
| 5,925,117 | A * | 7/1999 | Kirby et al. | 710/303 |
| 6,029,211 | A * | 2/2000 | Nakashima | 710/14 |
| 6,044,422 | A * | 3/2000 | Tran | 710/69 |
| 6,169,789 | B1 | 1/2001 | Rao et al. | |
| 6,211,862 | B1 | 4/2001 | Park et al. | |
| 6,266,539 | B1 * | 7/2001 | Pardo | 455/556.2 |
| 6,312,175 | B1 | 11/2001 | Lum | |
| 6,359,591 | B1 * | 3/2002 | Mou | 343/702 |
| 6,542,946 | B1 * | 4/2003 | Wooten | 710/106 |
| 6,584,336 | B1 * | 6/2003 | Ali et al. | 600/323 |
| 6,593,878 | B2 * | 7/2003 | Fall | 342/357.1 |
| 6,680,924 | B2 * | 1/2004 | Hills et al. | 370/329 |
| 2003/0101303 | A1 * | 5/2003 | Kung | 710/301 |
| 2004/0002872 | A1 * | 1/2004 | Wright | 705/2 |

FOREIGN PATENT DOCUMENTS

JP 01114251 A * 5/1989

OTHER PUBLICATIONS

Microsoft, Computer Dictionary, Microsoft Press, Fifth Edition, p. 266.*
Microsoft Computer Dictionary, Fifth Edition, Microsoft press 2002, p. 543.*

* cited by examiner

*Primary Examiner*—Niketa I Patel
(74) *Attorney, Agent, or Firm*—Ryan, Mason & Lewis, LLP

(57) ABSTRACT

A peripheral connectable to a processing device includes a housing and network interface circuitry at least partially enclosed within the housing, the network interface circuitry being utilizable by the processing device to establish a connection between the processing device and a network. The peripheral further includes peripheral circuitry disposed within the housing and adapted to perform at least a portion of at least one of an input function and an output function for the processing device in a manner unrelated to utilization of the network interface circuitry by the processing device. In an illustrative embodiment, the network interface circuitry comprises a wireless local area network (LAN) interface card, module or access point, the processing device comprises a computer, and the peripheral comprises a keyboard, monitor, speaker, docking station or other peripheral connectable to the computer.

20 Claims, 3 Drawing Sheets

PROCESSING DEVICE PERIPHERAL WITH INTEGRAL NETWORK INTERFACE CIRCUITRY

FIELD OF THE INVENTION

The present invention relates generally to peripherals for use with computers and other types of information processing devices, and more particularly to techniques for providing network interface cards or other types of network interface circuitry in conjunction with such processing device peripherals.

BACKGROUND OF THE INVENTION

In a conventional computer system configuration, a network interface card, such as a wireless local area network (LAN) interface card for supporting communication in accordance with the well-known IEEE 802.11b standard, is often incorporated into the computer itself. For example, a typical configuration involves insertion oft he card into a designated slot within the computer housing. FIG. 1 shows a conventional desktop computer system 100 configured in this manner. The computer system 100 includes a computer 102 having attached thereto a number of peripherals including a monitor 104 and a keyboard 106. A wireless network interface card 110 is embedded within the computer 102, via insertion in an appropriate card slot or otherwise, and communicates with the computer over an internal bus interface such as a Peripheral Component Interconnect (PCI) bus or an Industry Standard Architecture (ISA) bus. A problem with this type of configuration is that the network interface card is immersed in the internal environment of the computer, such that it is subject to radio frequency (RF) noise. Since the network interface card is itself a wireless RF device, placing it within the computer in this manner can negatively impact the performance of the card. For example, the data throughput of the card may be reduced.

Another possible configuration involves attaching the network interface card to the computer as an external stand-alone peripheral. The connection between the computer and the peripheral may be made using a conventional Universal Serial Bus (USB) cable or Ethernet connection. FIG. 2 shows a conventional arrangement of this type. A computer system 200 includes computer 202, monitor 204 and keyboard 206 arranged as shown. A network interface card is attached to the computer 202 as a stand-alone peripheral 210. The connection between computer 202 and the stand-alone network interface card peripheral 210 is made via a cable 212 which, as indicated above, may represent a USB or Ethernet connection.

In the FIG. 2 configuration, the network interface card peripheral is a stand-alone peripheral, separate from other common computer peripherals such as keyboards, monitors, speakers, docking stations and so on. Unfortunately, the requirement of an additional peripheral to provide the network interface card unduly increases the number of peripherals and associated connections, thereby complicating the system configuration.

It is also known in the art to connect certain computer peripherals to the computer via a wireless link. For example, a wireless communication standard such as Bluetooth may be used as a "wire replacement" in systems such as those shown in FIGS. 1 and 2. This means that instead of a keyboard or mouse using a cable to connect to the computer, these peripheral devices would connect to the computer over a wireless Bluetooth link. Similarly, some existing computers have infrared links to keyboards or other peripherals. A typical example of such an arrangement is the wireless keyboard disclosed in U.S. Pat. No. 5,793,359 entitled "System for RF Communication Between a Computer and a Remote Wireless Data Input Device." These and other existing wireless interface arrangements, however, fail to address the problems identified above regarding conventional stand-alone network interface card peripherals.

In view of the foregoing, it is apparent that what is needed is an improved arrangement for incorporating network interface circuitry into a computer system or other system comprising one or more information processing devices.

SUMMARY OF THE INVENTION

The present invention provides a computer peripheral or other information processing device peripheral having integral network interface circuitry. Unlike a conventional stand-alone network interface peripheral, a peripheral in accordance with the present invention includes, in addition to the network interface circuitry, peripheral circuitry for performing an input or output function unrelated to the network interface.

In accordance with one aspect of the invention, a peripheral connectable to a processing device includes a housing and network interface circuitry at least partially enclosed within the housing. The network interface circuitry is utilizable by the processing device to establish a connection between the processing device and a network. The peripheral further includes peripheral circuitry disposed within the housing and adapted to perform at least a portion of at least one of an input function and an output function for the processing device in a manner unrelated to utilization of the network interface circuitry by the processing device.

In an illustrative embodiment, the network interface circuitry comprises a wireless local area network (LAN) interface card, module or access point, configured in accordance with the IEEE 802.11b standard or other wireless network standard. The processing device may comprise a computer, and the peripheral may comprise a keyboard, monitor, speaker, docking station or other peripheral connectable to the computer. The invention in this embodiment may thus involve modification of an existing computer peripheral, which is configured to support one or more input or output functions for the computer, to incorporate network interface circuitry that the computer can use to establish a connection with a network.

Advantageously, a peripheral with integral network interface circuitry configured in accordance with the techniques of the invention allows physical separation between the network interface circuitry and its associated computer or other processing device, thereby overcoming the noise problems associated with conventional incorporation of network interface circuitry directly into the processing device. Moreover, such a peripheral in accordance with the invention does not take up additional space on a desk or other work surface, and therefore results in a reduced-complexity system configuration.

DETAILED DESCRIPTION OF THE INVENTION

The invention will be illustrated herein in conjunction with exemplary computer systems in which a network interface card, module or other type of network interface circuitry is incorporated as an element of an otherwise conventional computer peripheral such as a keyboard, monitor, speaker or docking station. It should be understood, however, that the invention is not limited to use in computer systems, and is more generally applicable to any processing device which can utilize network interface circuitry and is connectable to a peripheral. For example, the invention can be used in conjunction with a mobile telephone, a personal digital assistant (PDA), a video game console or other type of processing device. Moreover, the invention does not require the use of any particular configuration of network interface circuitry, and such circuitry may be implemented as a network interface card, a network interface module, or in a wide variety of other types of configurations.

Figure 3:
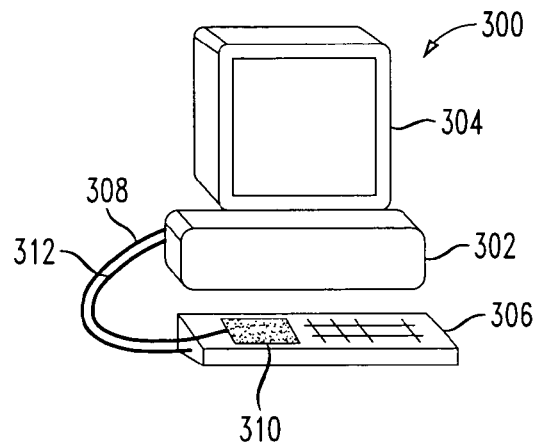
FIG. 3 shows a computer system in accordance with an illustrative embodiment of the invention in which network interface circuitry is incorporated into a keyboard coupled to a computer.

FIG. 3 shows a computer system 300 configured in accordance with an illustrative embodiment of the invention. The computer system 300 includes a computer 302 having a number of peripherals attached thereto. The peripherals shown in this embodiment include a monitor 304 and a keyboard 306. The keyboard 306 is coupled via a conventional keyboard cable 308 to the computer 302.

In accordance with the invention, the keyboard 306 is also configured to include network interface circuitry comprising a wireless local area network (LAN) interface card 310. The interface card 310 may be configured in accordance with IEEE Standard 802.11b, Part 11: Wireless LAN Medium Access Control (MAC) and Physical Layer (PHY) specifications: Higher-Speed Physical Layer Extension in the 2.4 GHz Band, http://ieee802.org/11, which is incorporated by reference herein, although the invention does not require the use of any particular wireless network standard. The wireless network interface card 310 is coupled to the computer 302 via a cable or other connection 312. The network interface card 310 is preferably fully incorporated within the housing of the keyboard 306, but may alternatively be partially incorporated within the housing, e.g., may be mounted on or otherwise attached to the housing.

Figure 1:
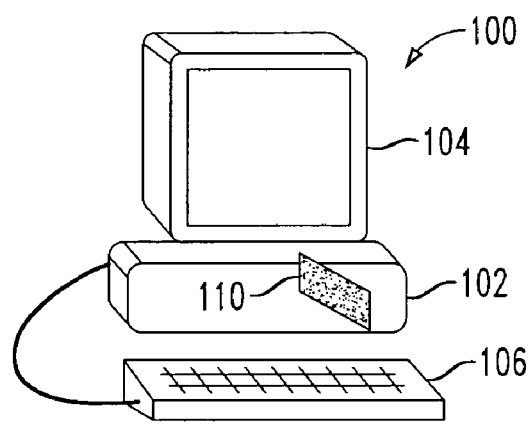
FIG. 1 shows a conventional computer system which includes a computer having a network interface card embedded therein.
Figure 2:
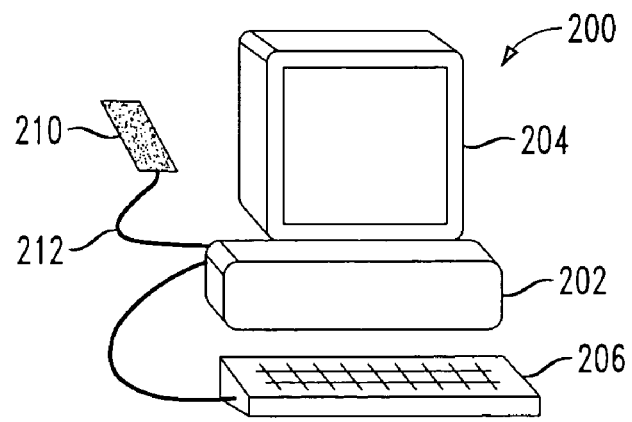
FIG. 2 shows a conventional computer system which includes a computer having a network interface card attached thereto as a stand-alone peripheral.

The FIG. 3 embodiment thus incorporates a network interface card into an otherwise conventional computer peripheral, in this case the keyboard 306. This is in contrast to the conventional approach of FIG. 1, in which the network interface card is incorporated into the computer itself. It is also in contrast to the conventional approach of FIG. 2, in which the network interface card is implemented as a stand-alone peripheral, that is, a peripheral which performs substantially no input or output functions for the computer other than those associated with the network interface. As will be described in greater detail below, the network interface card 310 incorporated into the keyboard 306 is utilized by the computer 302 in a conventional manner, that is, to establish a connection between the computer 302 and a wireless network external to the computer 302.

The incorporation of the wireless network interface card 310 into the keyboard 306 as illustrated in FIG. 3 provides a number of significant advantages over the conventional techniques previously described. For example, the network interface card 310 in FIG. 3 is physically removed from the interior of the computer 302, which protects it from internal radio frequency (RF) noise generated by the computer 302. This physical separation can improve the RF performance of the network interface card 310. Another advantage is that the network interface card 310 does not take up additional desk or work surface space because it is at least partially incorporated into the keyboard housing.

The cable or other connection 312 which connects the network interface card 310 to the computer 302 may be a conventional Universal Serial Bus (USB) or Ethernet connection. Other types of connections suitable for use between network interface card 310 and computer 302 include, by way of example, fiber optic cable and IEEE 1394 wired connections. In the FIG. 3 embodiment, element 312 may be configured to run in tandem with keyboard cable 308, e.g., as a pair of distinct cables, as separate cables contained within a common single shielding or sheath, etc.

Power can be supplied to the wireless network interface card 310 through one or more wires in the cable or other connection 312, or from a power source installed within the keyboard 306, or using other techniques, as will be readily appreciated by those skilled in the art.

In accordance with another aspect of the invention, a single cable or other single interconnection interface can be shared by the keyboard 306 and the network interface card 310. For example, a single USB cable can be used to connect both the keyboard 306 and the network interface card 310 to the computer 302. Such an arrangement is particularly advantageous in that newer keyboards and other peripherals often already include a USB connection, and this connection can be shared with the network interface card 310 in accordance with the techniques of the invention. This arrangement reduces system complexity by eliminating a cable, and facilitates peripheral upgrades by providing a "plug and play" configuration.

The above-described example single-cable embodiment could be implemented in a number of different ways. For example, the keyboard and network interface card could be configured as a combination USB target having a single software driver. As another example, the keyboard and network interface card could be configured as a USB hub having two separate attached devices. The latter implementation has the additional advantage that the software drivers required would be the standard driver for a USB keyboard and the standard driver for a USB attached wireless network interface card.

In other single-cable embodiments, a single cable could include separate sets of wires for the keyboard and the network interface card. For example, the single cable may include at least one wired connection associated with the keyboard and at least one additional wired connection associated with the network interface card.

More generally, as mentioned previously, the keyboard 306 and network interface card 310 may at least partially share a common interconnection interface with the computer 302. This common interconnection interface may be a USB interface.

As indicated above, power for both the keyboard and network interface card in the single-cable or single-interface embodiments can be supplied via the respective cable or interface, or using other suitable techniques familiar to those skilled in the art.

It is preferable to orient the wireless network interface card 310 in a manner that maximizes its RF coverage and performance within the system 300. The particular orientation best suited for a given application will typically depend upon a number of application-specific factors, and may thus vary from platform to platform. It may also be a function of the particular type of antenna that is included within the wireless network interface card. However, the invention does not require any particular orientation, and techniques for ensuring an appropriate orientation for a given embodiment are well within the purview of the skilled artisan.

The term "network interface circuitry" as used herein should be understood to include not only a wireless LAN interface card such as card 310 in the FIG. 3 embodiment, but also any other type of card, module or other circuitry that is utilizable by the computer 302 in establishing a connection between the computer 302 and a network. For example, in an alternative embodiment of the invention, the network interface circuitry may comprise a wireless LAN access point (AP), such as an IEEE 802.11b access point, in place of or in addition to a network interface card. Although an access point is typically a more complex device than a network interface card, such devices are continually shrinking in size and power consumption, and thus can be integrated into existing computer peripherals using the techniques of the invention.

It should be understood that the particular arrangement of system elements shown in FIG. 3 is by way of illustrative example only. For example, as previously noted, the invention can be implemented in peripherals attachable to other types of processing devices, and can use other arrangements of network interface circuitry.

Figure 4:
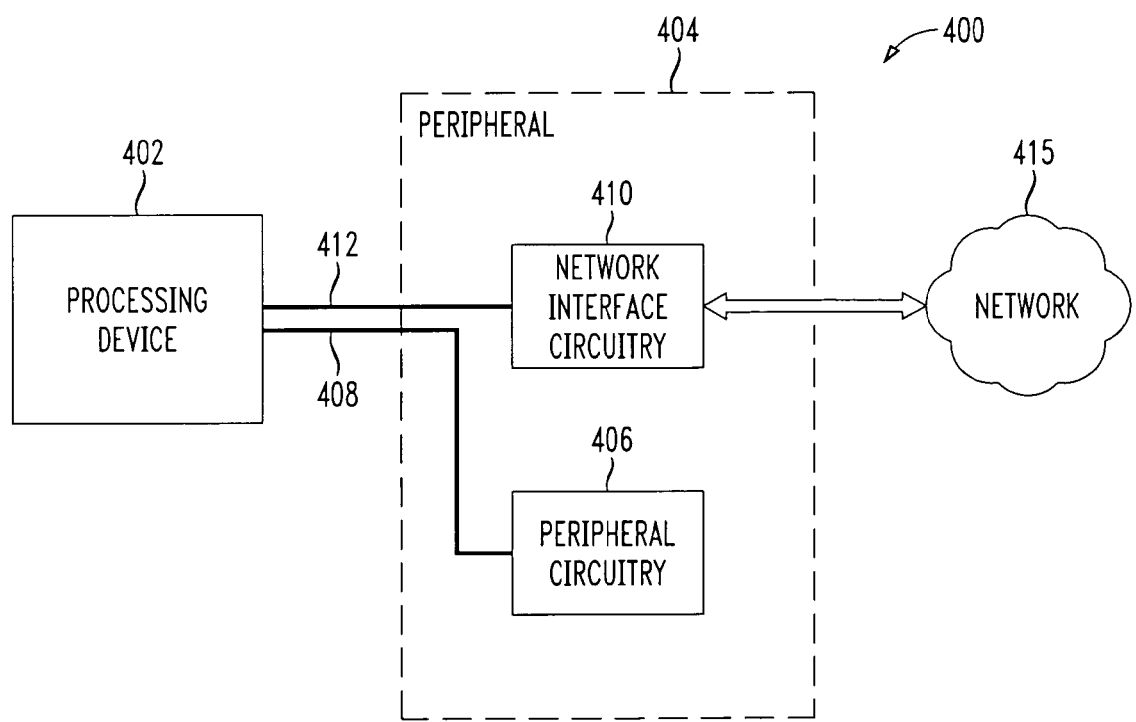
FIG. 4 is a simplified block diagram of an information processing system configured in accordance with the techniques of the invention.

FIG. 4 shows a more general embodiment of the invention, in the form of an information processing system 400 which includes a processing device 402 having a peripheral 404 attached thereto. The peripheral 404 includes peripheral circuitry 406 coupled to the processing device 402 via a connection 408, and network interface circuitry 410 coupled to the processing device 402 via a connection 412. The peripheral circuitry 406 and the network interface circuitry 410 are each preferably incorporated within a housing of the peripheral 404. Examples illustrating the incorporation of the network interface circuitry within the housing of a peripheral will be described in conjunction with FIGS. 5, 6 and 7 below.

The network interface circuitry 410, which as indicated above may comprise at least one of a network interface card and an access point, is utilizable by the processing device 402 to establish a connection between the processing device 402 and a network 415. The network 415 may represent, by way of example and not limitation, a wireless LAN, a metropolitan area network (MAN), the Internet, an intranet or extranet, or any other type of network as well as portions or combinations of such networks.

The peripheral circuitry 406 performs at least a portion of at least one of an input function and an output function for the processing device 402 in a manner unrelated to utilization of the network interface circuitry 410 by the processing device 402. For example, in a case in which the processing device 402 comprises a computer and the peripheral 404 comprises a keyboard, the peripheral circuitry 406 may comprise internal circuitry oft he keyboard, such as the keyboard switch matrix, which is used in performing data entry to the computer via the keyboard.

A number of other examples of peripherals with integral network interface circuitry in accordance with the invention will now be described with reference to FIGS. 5, 6 and 7. Each of the peripherals shown in these figures represents an example of the peripheral 404 of FIG. 4, and is connectable to a processing device 402 typically in the form of a computer. Moreover, each of these example peripherals includes, in addition to network interface circuitry for establishing a connection between the processing device and a network, peripheral circuitry for performing at least a portion of at least one of an input function and an output function for the processing device in a manner unrelated to utilization of the network interface circuitry by the processing device. For simplicity of illustration, wires, cables or other means for connecting data and power lines to the network interface circuitry are not shown in these figures. It will be appreciated by those skilled in the art that such connections may be implemented in a straightforward manner.

Figure 5:
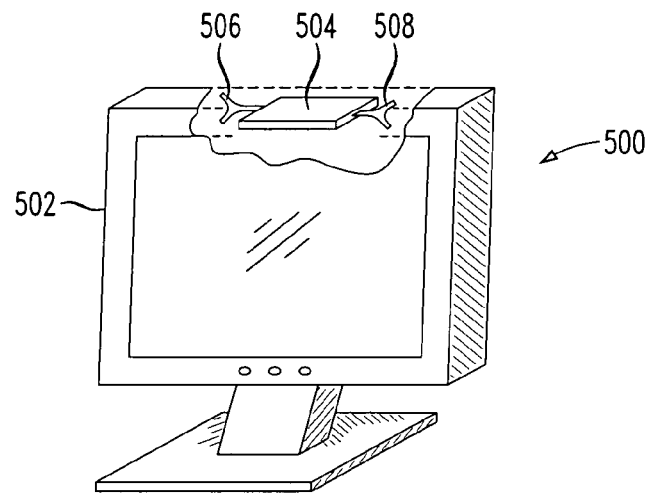
FIG. 5 shows an alternative embodiment of the invention in which network interface circuitry is incorporated into an otherwise conventional computer monitor.

Referring now to FIG. 5, a computer monitor 500 comprises a housing 502 and a network interface module 504 incorporated within the housing 502. The monitor 500 may be a cathode ray tube (CRT) monitor, liquid crystal display (LCD) monitor, or other type of monitor. The network interface module 504 may comprise a wireless network interface card, an AP, or other type of network interface circuitry.

In general, it is preferable to arrange the network interface module 504 at as high as possible a position in the computer monitor 500. This will help to provide improved transfer of the RF signals associated with the module by elevating the module above interfering objects or other potentially interfering elements. In addition, the network interface module 504 should be physically separated from other components which generate RF noise. This means the module should be as far away as possible from radiating elements such as crystals, oscillators, CRT guns or processors.

The network interface module 504 as shown in FIG. 5 includes a pair of external antenna elements 506 and 508, arranged to support receiver diversity. The elements are illustratively shown as extending from opposing sides oft he module. Alternatively, such elements can be integrated onto an internal printed wiring board (PWB) of the module or otherwise incorporated into the module itself. It should be understood, however, that the invention does not require any particular configuration of antenna elements.

In the FIG. 5 example, the computer monitor 500 includes peripheral circuitry, not specifically shown in the figure, for performing an output function for the associated computer or other processing device in a manner unrelated to utilization of the network interface module 504 by the processing device. The output function in this case may involve the processing of video data for display on the monitor.

It should be noted with regard to the FIG. 5 embodiment that many existing monitors incorporate a USB hub. This USB hub can be used to provide an interface that can be shared between monitor circuitry and integral network interface circuitry in accordance with the techniques of the invention, in a manner similar to that described above in conjunction with FIG. 3.

Figure 6:
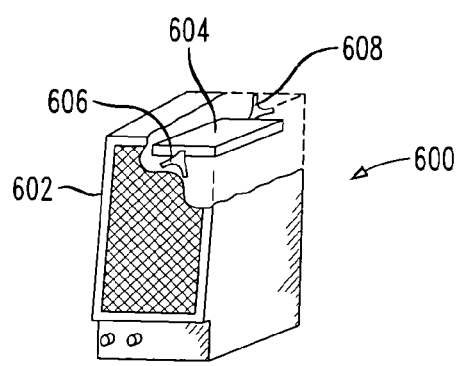
FIG. 6 shows an alternative embodiment of the invention in which network interface circuitry is incorporated into an otherwise conventional computer speaker.

FIG. 6 shows a peripheral comprising a speaker 600 that is connectable to a computer or other processing device. The speaker includes a housing 602 having a network interface module 604 incorporated therein. Again, the module 604 may represent a wireless LAN interface card, an AP module, or other type of network interface circuitry. As in the FIG. 5 example, the module 604 in this example is arranged near the top of the peripheral housing, and includes a pair of antenna elements 606 and 608.

In the FIG. 6 example, the speaker 600 includes peripheral circuitry, not specifically shown in the figure, for performing an output function for the associated computer or other processing device in a manner unrelated to utilization of the network interface module 604 by the processing device. The output function in this case may involve the amplification or other processing of audio data for output via the speaker.

Figure 7:
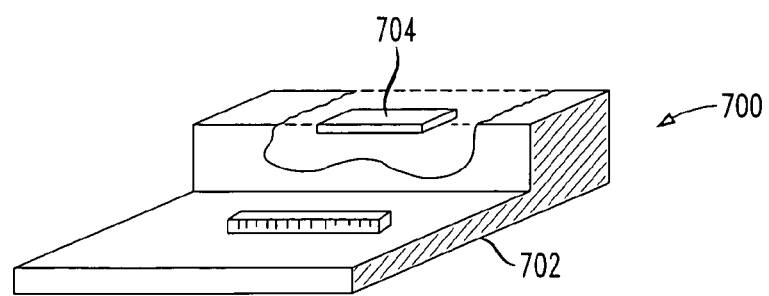
FIG. 7 shows an alternative embodiment of the invention in which network interface circuitry is incorporated into an otherwise conventional computer docking station.

The FIG. 7 example shows a peripheral comprising a computer docking station 700 which includes a housing 702 having a network interface module 704 incorporated therein. The docking station 700 is configured to receive a portable computer, which is not shown in the figure, for docking. The module 704, which as in the other examples may represent any type of network interface circuitry, is arranged in an upper portion of the housing 702. In this example, it is assumed that the antenna elements are incorporated within the module 704 or arranged elsewhere within the housing 702.

Like the previous examples, the docking station 700 in the FIG. 7 example includes peripheral circuitry, not specifically shown in the figure, for performing at least one of an input function and an output function for an associated docked computer or other processing device in a manner unrelated to utilization of the network interface module 704 by the processing device. The input and output functions in this case may involve the processing of data for delivery to the docked computer and the processing of data received from the docked computer, respectively.

The above-described embodiments of the invention are intended to be illustrative only. For example, although the illustrative embodiments are directed to computer peripherals, such as a keyboard, a monitor, a speaker or a docking station, having an integrated network interface card, module or other type of network interface circuitry, the invention is not restricted to use with computer peripherals, and can be used with peripherals attachable to other types of processing devices, such as mobile telephones, PDAs, etc. In addition, the invention is not limited as to the particular type of peripheral in which the network interface circuitry is incorporated. Alternative peripherals that can be configured to include network interface circuitry in accordance with the techniques of the invention include, again by way of example and not limitation, printers, cameras, scanners, mice, joysticks, PDA cradles, projectors, MP3 players, stand-alone storage devices, etc. Also, with regard to the single-cable or single-interface USB embodiments described above, any type of USB device, such as a USB mouse or a USB hub, can be configured to incorporate a network interface card in the manner described. These and numerous other alternative embodiments within the scope of the following claims will be readily apparent to those skilled in the art.

What is claimed is:

1. A peripheral connectable to a processing device, the peripheral comprising:
   a housing;
   wireless network interface circuitry at least partially enclosed within the housing, the network interface circuitry being utilizable by the processing device to establish a wireless connection between the processing device and a network; and
   peripheral circuitry disposed within the housing and adapted to perform at least a portion of at least one of an input function and an output function for the processing device in a manner unrelated to utilization of the network interface circuitry by the processing device; wherein the function comprises transferring information between the processing device and an element external to the peripheral without requiring a network connection between the peripheral and the element external to the peripheral.

2. The peripheral of claim 1 wherein the processing device comprises a computer.

3. The peripheral of claim 2 wherein the peripheral comprises a keyboard connectable to the computer.

4. The peripheral of claim 2 wherein the peripheral comprises a monitor connectable to the computer.

5. The peripheral of claim 2 wherein the peripheral comprises a speaker connectable to the computer.

6. The peripheral of claim 2 wherein the computer comprises a portable computer and the peripheral comprises a docking station connectable to the portable computer.

7. The peripheral of claim 1 wherein the wireless network interface circuitry comprises a wireless network interface card.

8. The peripheral of claim 7 wherein the wireless network interface card comprises an IEEE 802.11 wireless network interface card.

9. The peripheral of claim 1 wherein the wireless network interface circuitry comprises a wireless network interface module.

10. The peripheral of claim 9 wherein the wireless network interface module comprises an IEEE 802.11 wireless network interface module.

11. The peripheral of claim 1 wherein the wireless network interface circuitry comprises a wireless network access point.

12. The peripheral of claim 11 wherein the wireless network access point comprises an IEEE 802.11 wireless network access point.

13. The peripheral of claim 1 wherein the wireless network interface circuitry is arranged in an upper portion of the housing of the peripheral so as to minimize interference between the wireless network interface circuitry and one or more potentially interfering elements of an associated system.

14. The peripheral of claim 1 wherein the peripheral is connectable to the processing device via a single cable that is at least partially shared by the wireless network interface circuitry and the peripheral circuitry.

15. The peripheral of claim 14 wherein the single cable comprises at least one wired connection associated with the wireless network interface circuitry and at least one additional wired connection associated with the peripheral circuitry.

16. The peripheral of claim 14 wherein the single cable comprises a Universal Serial Bus (USB) cable.

17. The peripheral of claim 1 wherein the peripheral is connectable to the processing device via a common interconnection interface that is at least partially shared by the wireless network interface circuitry and the peripheral circuitry.

18. The peripheral of claim 17 wherein the common interconnection interface comprises a Universal Serial Bus (USB) interface.

19. A processing system comprising:
   a processing device; and
   a peripheral connectable to the processing device, the peripheral comprising a housing, wireless network interface circuitry at least partially enclosed within the housing, and peripheral circuitry disposed within the housing, the wireless network interface circuitry being utilizable by the processing device to establish a wireless connection between the processing device and a network, the peripheral circuitry being adapted to perform at least a portion of at least one of an input function and an output function for the processing device in a manner unrelated to utilization of the network interface circuitry by the processing device;

wherein the function comprises transferring information between the processing device and an element external to the peripheral without requiring a network connection between the peripheral and the element external to the peripheral.

20. A method for use in a processing system comprising a processing device and a peripheral connectable to the processing device, the method comprising the steps of:

at least partially enclosing wireless network interface circuitry within a housing of the peripheral; and utilizing the wireless network interface circuitry to establish a connection between the processing device and a network;

the peripheral further comprising peripheral circuitry being disposed within the housing and adapted to perform at least a portion of at least one of an input function and an output function for the processing device in a manner unrelated to utilization of the network interface circuitry by the processing device;

wherein the function comprises transferring information between the processing device and an element external to the peripheral without requiring a network connection between the peripheral and the element external to the peripheral.

* * * * *